United States Patent [19]

Partridge

[11] Patent Number: 4,477,055
[45] Date of Patent: Oct. 16, 1984

[54] VALVE SEAT FOR BALL VALVES

[75] Inventor: Charles C. Partridge, Houston, Tex.

[73] Assignee: ACF Industries, Incorporated, New York, N.Y.

[21] Appl. No.: 509,483

[22] Filed: Jun. 30, 1983

[51] Int. Cl.³ .............................................. F16K 25/00
[52] U.S. Cl. .................................... 251/174; 137/328;
251/315; 251/317; 251/362; 251/363; 251/365
[58] Field of Search ................ 137/327; 251/174, 315,
251/316, 317, 362, 363, 365

[56] References Cited

U.S. PATENT DOCUMENTS

| | | | |
|---|---|---|---|
| 2,825,527 | 3/1958 | Wendell | 251/315 X |
| 3,473,554 | 10/1969 | King | 251/315 X |
| 3,542,054 | 11/1970 | Worley | 251/315 X |
| 4,085,770 | 4/1978 | Wononowioz | 251/315 X |

*Primary Examiner*—Harold W. Weakley
*Attorney, Agent, or Firm*—David A. Warmbold

[57] ABSTRACT

A ball valve structure (10) having a valve seat assembly (46) positioned in annular seat pockets located in a flow passage (14) on opposed sides of a ball valve member (18). Each valve seat assembly is mounted for limited longitudinal movement toward and away from the adjacent ball valve member (18) and spring means (54) are placed within the seat pockets behind the valve seat assemblies to urge the assemblies toward and into intimate contact with the ball valve member. The valve seat assembly includes inner and outer annular concentric seat rings (48, 50) with a resilient sealing ring (52) secured therebetween. The inner annular seat ring has a flared end (64) which fits inside the outer seat ring and energizes or deforms the sealing ring (52) held therebetween, thereby, securely retaining the sealing ring between the seat rings and preventing the introduction of line pressure behind the sealing ring to possibly extrude the sealing ring from its position within the seat rings. The co-acting seat rings deform the sealing ring such as to provide a protruded annular sealing portion (96) which extends beyond the end boundaries of the sealing ring facing the ball valve member so that upon intimate contact with the ball valve member the protruded sealing portion (96) provides a high pressure sealing element to prevent pressurized fluid from escaping from the flow passage of the ball valve structure.

14 Claims, 5 Drawing Figures

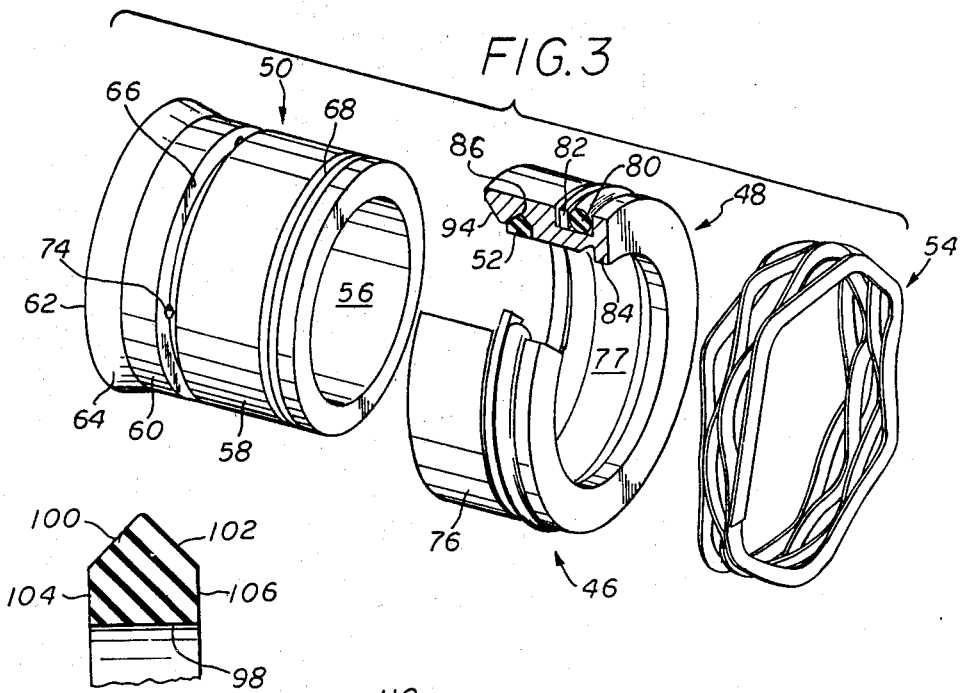
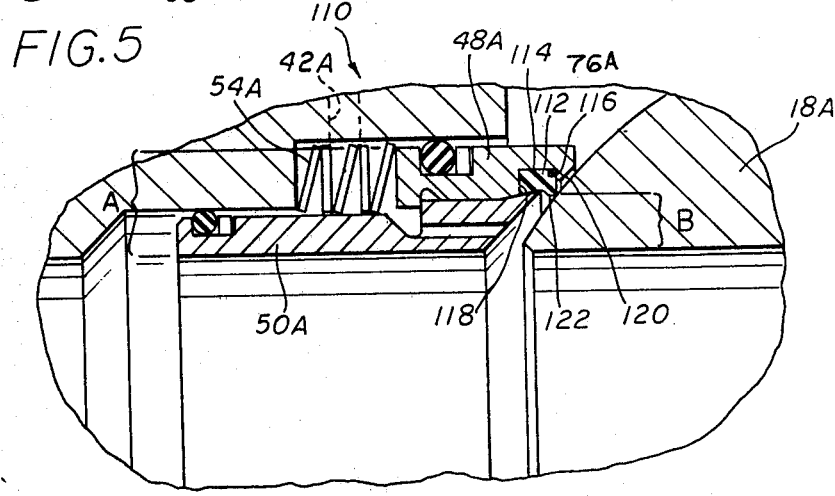

VALVE SEAT FOR BALL VALVES

BACKGROUND OF THE INVENTION

This invention relates generally to ball valves for controlling fluid flow and, more particularly, to a ball valve having an improved valve seat assembly constructed of concentric seat rings which enclose and energize a resilient sealing element.

Heretofore, in the manufacture of ball valves, valve seats are typically constructed of a single piece annular seat ring having a press fit resilient sealing ring in a face thereof. The valve seats are placed in valve seat pockets such that the sealing rings contact the ball valve member. However, in this type of construction, the mounting of the sealing ring in the seat ring is often difficult in that the sealing ring must be press fit into a groove in the seat ring or it must be placed into a groove in the seat ring and, then, the seat ring deformed to grip or secure the sealing ring. These types of construction are undesirable from a manufacturing standpoint because in the first case once the sealing ring is press fit into the groove it is difficult to remove or replace and, in the second case, it is difficult to determine the force necessary to deform the seat ring into gripping engagement with the sealing ring. Therefore, in these types of construction, field replacement of the sealing ring requires replacement of the complete valve seat assembly resulting in increased production costs.

A valve seat utilizing two concentric seat rings emcompassing a replaceable sealing ring is also not necessarily new in the art. One type of valve seat assembly constructed in this manner is described in U.S. Pat. No. 4,071,041 assigned to the same assignee as the present application. However, In U.S. Pat. No. 4,071,041 the concentric seat rings are held together by separate locking means, thereby, requiring extra manufacturing steps to complete the valve seat assembly. Furthermore, the seat rings do not positively lock and energize the sealing ring between them, thereby, allowing line pressure to get behind the sealing ring causing its extrusion under high pressure.

SUMMARY OF THE INVENTION

In one embodiment of the invention, a ball valve is provided with valve seat assemblies, each assembly having two concentric seat rings press fit together to energize or deform a resilient rubber insert or ring. The valve seat assembly comprises an inner annular seat ring wherein a portion thereof rests in a nesting relation inside of a concentric outer seat ring and having an annular sealing ring mounted therebetween. The inner annular seat ring has a flared end which fits inside the outer seat ring and energizes or deforms the sealing ring held therebetween, therby, securely retaining the sealing ring between the concentric seat rings and preventing the introduction of line pressure behind the sealing ring resulting in extrusion of the sealing ring. The flared end of the inner seat ring also interacts against the sealing ring and outer seat ring in conjunction with the press fit of the two concentric seat rings to securely lock the two concentric seat rings together. The valve seat assemblies are positioned within seat pockets formed around the flow passageways adjacent opposite sides of a valve chamber. Spring means are placed within the seat pockets behind the valve seat assemblies in order to urge the valve seats toward the ball valve member. The energized sealing ring extends beyond the end boundries of the seat rings to contact the ball valve member to provide a seal between the ball valve member and the valve seat assembly to prevent fluid communication from the fluid flow passage of the ball valve to the valve chamber or exterior areas of the ball valve.

It is a primary object of the invention to provide an improved valve seat assembly which overcomes the aforementioned disadvantages of the prior art devices.

It is a further object of the invention to provide an improved valve seat assembly having concentric seat rings wherein a sealing ring is mechanically locked or energized into position under positive pressure between the concentric seat rings.

It is a further object of the invention to provide a valve seat assembly that requires a minimum number of manufacturing steps to complete the assembly.

It is a further object of the invention to provide a valve seat assembly that has a field replaceable sealing ring which can be accomplished without replacement of the concentric seat rings.

Various other objects, advantages and features of the invention will become apparent to those skilled in the art from the detailed description to follow, particularly when read in conjunction with the accompanying drawings.

BRIEF DESCRIPTION OF THE DRAWINGS

FIG. 3 is an exploded perspective view of the valve seat assembly shown in FIG. 2 including the spring means with portions thereof shown in cross-section;

FIG. 4 is an enlarged section of a valve seat assembly of another embodiment of this invention showing a hard plastic sealing insert ring; and FIG. 5 is an enlarged cross-section of the resilient rubber sealing insert shown in FIG. 3.

The following is a discussion and description of preferred specific embodiments of the seat ring construction of this invention, such being made with reference to the drawings whereupon the same referenced numerals are used to indicate the same or similar parts and/or structure. It is understood that such discussion and description is not to unduly limit the scope of the invention.

DESCRIPTION OF A PREFERRED EMBODIMENT

Figure 1:
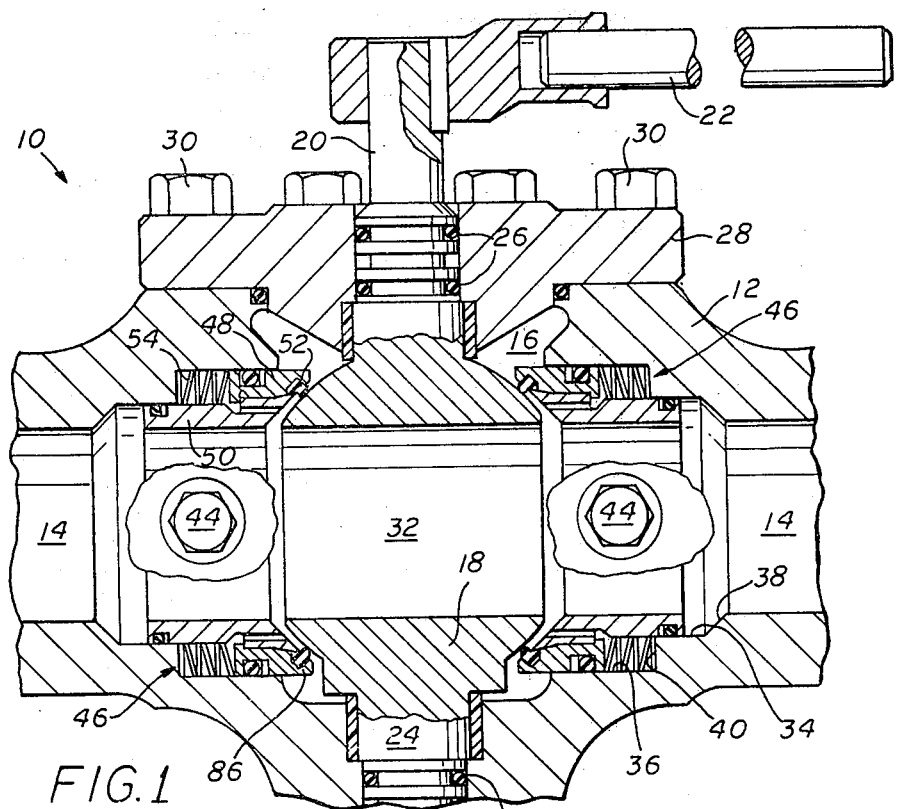
FIG. 1 is a cross-sectional view of a top entry style spherical ball valve employing the valve seat assembly of one embodiment of this invention.

Referring now to the drawings and particularly FIG. 1, a ball valve structure is shown generally at 10 including a valve body 12 having flow passages 14. A valve chamber 16 between flow passages 14 has a ball valve member 18 mounted therein for movement between open and closed positions. A stem 20 secured to ball valve member 18 has a handle 22 which may be gripped for moving ball valve 18 between open and closed positions relative to flow passages 14. A lower trunnion 24 is mounted on the lower side of ball valve member 18. O-rings 26 are positioned on the stem and the lower trunnion to prevent leakage exteriorly of the ball valve structure. An upper cover plate 28 is removably connected to valve body 12 by suitable studs 30 which allows ball valve member 18 to be removed from the valve body without disturbing the end connections of the valve. Ball valve member 18 has a flow passage 32 therethrough which is adapted to be aligned with flow passages 14 when moved to an open position thereof as shown in FIG. 1.

Valve body 12 at the juncture of flow passages 14 with valve chamber 16 has an opposing pair of enlarged bore portions or seat pockets defined by intermediate diameter bore portion 34 and enlarged diameter bore portion 36. Intermediate diameter bore portion 34 defines a tapered shoulder or abutment 38 and enlarged diameter bore portion 36 defines a shoulder or abutment 40 which faces valve chamber 16. A lubricant passageway 42 is provided in valve body 12 which communicates from a lubricant fitting 44 on the exterior of valve body 12 to the enlarged diameter bore portion 36.

Figure 2:
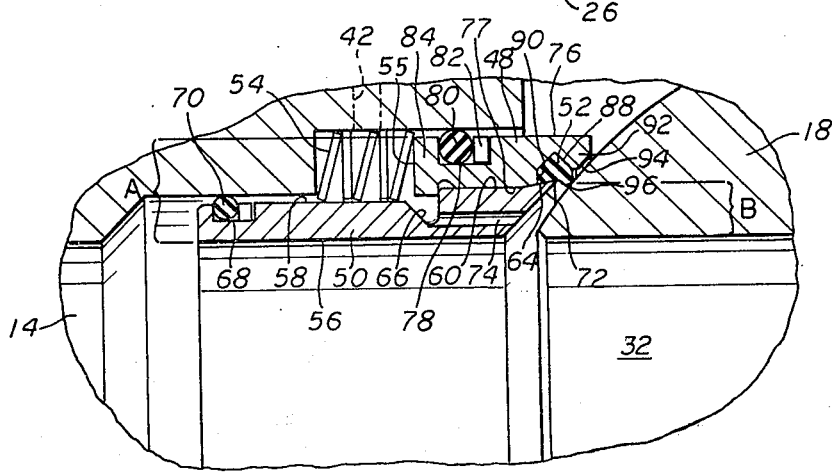
FIG. 2 is an enlarged section of the valve seat construction shown in FIG. 1 showing a resilient rubber sealing insert ring contacting the ball valve member.

In the improvement of the present invention, valve seat assemblies generally indicated at 46 are fitted within the enlarged bore portions 34 and 36 for floating longitudional movement relative to ball valve member 18. The valve construction for a top entry ball valve 10 must necessarily be such that the valve seat assemblies 46 can be retracted or displaced outwardly relative to ball valve member 18 so that the ball valve member can be inserted and removed from valve body 12. Referring to FIGS. 2 and 3, the valve seat assembly 46 includes an outer seat ring 48 which surrounds a portion of an inner seat ring 50 and carries a sealing ring 52 therebetween. A continuous wave spring 54 is positioned within the enlarged diameter bore portion 34 of the seat pockets outwardly of the valve seat assemblies 46 relative to the ball valve member 18 so that one end thereof contacts shoulder 40 and the other end contacts an end 55 of the outer seat ring 48 to continuously urge the valve seat assemblies inwardly toward the ball valve member 18 such that the sealing ring 52 contacts the outer sealing face of the ball valve member to provide sealing in the open and closed positions thereof. The inner seat ring 50 has an inner circumferential or peripheral surface 56, a small diameter outer peripheral surface 58, and intermediate diameter outer peripheral surface 60 and a large diameter outer peripheral edge 62. The large diameter outer peripheral edge 62 defines a frusto-conical surface 64 between edge 62 and intermediate peripheral surface 60. A recess 66 is formed in the outer peripheral surface of inner seat ring 50 between outer peripheral surfaces 58 and 60, and the recess 66 communicates with the lubricant passageway 42 when the valve seat is positioned within the seat pocket of the ball valve. The small diameter outer peripheral surface 58 is interrupted by an outer peripheral groove 68 receiving an O-ring 70. The end of the inner seat ring member 50 which faces the ball valve member 18 has a conically shaped end surface portion 72 which is positioned generally tangential to the sealing face of ball valve member 18. A plurality of spaced apertures or ports 74 are provided through the inner seat ring 50 communicating between the recess 66 and the conically shaped end surface portion 72 and are employed as will be further explained for the passage of lubricants or sealants and to provide a pressure equalization function.

The outer seat ring 48 has an outer peripheral surface 76 which is interrupted by an outer peripheral groove 78 receiving an O-ring 80 and back up ring 82, and an inner peripheral surface 77 of substantially the same diameter as the intermediate diameter outer peripheral surface 60 of the inner seat ring 50. The two seat rings 48 and 50 are press fit together such that the outer seat ring inner surface 77 slidingly engages the intermediate outer surface of the inner seat ring 50. The end portion 55 of outer seat ring 48 adjacent the outer groove 78 has a radially inwardly extending abutment 84 relative to the flow passages 14 which contacts the edge of the intermediate outer peripheral surface 60 of inner seat ring 50 when the two seat rings 48 and 50 are positioned together as shown in FIG. 2. The opposite end portion of outer seat ring 48 which is adjacent the ball valve member 18 has an inner groove 86 forming a seal pocket to receive sealing ring 52. Groove 86 is defined by a V-shaped annular wall 88 concentric with outer peripheral surface 76, a radially disposed inwardly extending side 90, and an inwardly extending lip portion 92 on the other side of groove 86 adjacent the ball valve member 18. The outer end of seat ring 48 facing ball valve member 18 has a conically shaped end surface 94 outwardly divergent from inwardly extending lip 92 roughly parallel to conically shaped end surface 72 of the inner seat ring 50. When the two seat ring members 48 and 50 are positioned together as shown in FIG. 2, the end surface 94 of the outer seat ring 48 extends closer to the surface of ball valve member 18 than end surface 72 of inner seat ring 50 so that only the outer seat ring end surface 94 will make contact with ball valve member 18.

The annular sealing ring 52 is of a generally triangular shaped radial cross-section and is preferably formed of a resilient rubber material. The sealing ring 52 is positioned within the inner groove 86 of the outer seat ring 48. Referring to FIG. 2, when the inner and outer seat rings 50 and 48 are positioned together, the frusto-conical surface 64 of the inner seat ring 50 deforms or energizes the sealing ring 52 within groove 86, and an annular sealing portion 96 thereof is exposed for sealing engagement with the outer surface of the ball valve member 18 to establish a fluid-tight seal between the valve seat and ball valve member. As illustrated in FIG. 5, the sealing ring 52 is formed with a generally planar surface 96 which when assembled within the groove 86 engages the frusto-conical surface 64 of inner seat ring 50. Outer generally conical or V-shaped surfaces 100 and 102 on the sealing ring 52 are engaged by the corresponding V-shaped wall 88 of the outer seat ring 48 and the radially extending generally planar surfaces 104 and 106 on the sealing ring 52 are engaged, respectively, by the inwardly extending side 90 and lip portion 92 of the outer seat ring 48. The sealing ring 52 is clamped or energized between the seat rings 48 and 50 such that only the annular sealing portion 96 extends beyond the end boundaries of the concentric seat rings. The sealing ring 52 is positively held in place on both its inner and outer diameters such that flow passage fluid pressure is prevented from communicating into groove 86 behind sealing ring 52 to cause its possible extrusion or evacuation of groove 86. In this manner, when the valve seat assembly 46 is positioned within the ball valve structure 10 the fluid pressure existing in the flow passages 14 is unable to push out or extrude the sealing ring 52 from the groove 86 thereby providing a ball valve seal capable of withstanding relatively high pressures in the range of 2000 psi.

Referring to FIG. 3, it is seen that the valve seat assembly 46 is constructed by sliding the outer seat ring 48 with the sealing ring 52 positioned therein over the inner seat ring 50 until the abutment 84 of the outer seat ring 48 contacts the intermediate outer peripheral surface 60 of the inner seat ring 50. A special tool (not shown) is utilized to press fit the outer seat ring 48 over the inner seat ring 50 and the tool can be reversed to disengage the concentric seat rings to remove, replace or repair the sealing ring 52. Once engaged, the seat rings are further held together by the frusto-conical surface 64 of inner seat ring 50 deforming or energizing the sealing ring 52 and outer seat ring 48 to solidly hold the concentric seat rings 48 and 50 together as shown in FIG. 2. When assembled, the abutment 84 of outer seat ring 48 covers only a portion of recess 66 of inner seat ring 50 to allow fluid lubricant or sealant to pass from the lubricant passage 42 in the valve body 12 through recess 66 and ports 74 to the conically shaped end surface 94 of inner seat ring 50 and the adjacent outer surface of the ball valve member 18 for lubricating, or emergency sealing therebetween.

The ports 74 in inner seat ring 50 further provide a pressure equalization function in that fluid pressure existing in the flow passges 14 is communicated through ports 74 to the area outside inner seat ring 50 where wave spring 54 is positioned so that flow passage pressure is equalized on both inner and outer peripheral surfaces of the valve seat assembly. Furthermore, the ports 74 allow flow passage fluid pressure to pressure energize the valve seat assemblies in the direction of the ball valve member 18. Flow passage fluid pressure acts on the total cross-sectional area (A) at the outer ends of seat rings 48 and 50, but due to the sealing ring 52 sealingly contacting the exterior surface of ball valve member 18 at the annular sealing portion 96 the flow passage fluid pressure only acts on a portion of the cross-sectional area (B) of the inner ends of seat rings 48 and 50 relative to ball valve member 18. The resultant differential in fluid pressure acts to pressure energize the valve seat assembly 46 inwardly towards the exterior surface of the ball valve member 18.

FIG. 4 illustrates a modified valve seat assembly indicated generally at 110 which utilizes a Teflon sealing ring 122 instead of a resilient rubber sealing ring 52. Modified valve seat assembly 110 is essentially the same as valve seat assembly 46 except in regard to the shape and material of the sealing ring. Outer seat ring 48A is similar in all aspects except that the end portion adjacent the ball valve member 18A has an inner groove 114 of a generally rectangular shape to receive sealing ring 112. Groove 114 is defined by an annular peripheral wall 116 concentric with outer peripheral surface 76A, a radially disposed inwardly extending side 118, and an inwardly radially extending lip portion 120 on the other side of the groove 114 adjacent the ball valve member 18A. The sealing ring 112 is of a generally rectangular shape for placement in inner groove 114. The inner seat ring 50A is not changed so that its frusto-conical surface 64A will deform or energize sealing ring 112 when the two seat rings 48A and 50A are positioned as shown in FIG. 4, to provide an annular sealing portion 122 which extends beyond the confines of the seat rings providing a seal with ball valve member 18A. The sealing ring 112 is positively held in place on both inside and outside diameters to prevent flow passage fluid pressure to extrude the sealing ring 112 from between the seat rings 48A and 50A. The modified sealing ring 112 and valve seat assembly 110 is intended for use in ball valves subjected to greater pressures than 2000 psi.

In the use of the seat ring construction of this invention, it is to be noted that such can be easily constructed by fabricating the inner annular seat ring and the outer annular seat ring separately and adjoining them together with the sealing ring between them in a rather simple manufacturing process. Because the valve seat of this invention is constructed in separate members in the manner shown, it can be easily disassembled in the field for repair or replacement of the sealing ring which overcomes a disadvantage of the prior art devices in that such was difficult or impossible to do heretofore. Further, it is to be noted that by providing press fit surfaces between the seat rings and a frusto-conical surface portion to deform or energize the sealing ring the two seat rings are held together without the use of any separate attachment structures or steps of manufacture. Furthermore, the sealing ring is positively retained within the seat rings to prevent fluid pressure from getting behind it to possibly extrude the sealing ring from its place between the seat rings, thereby providing a high pressure ball valve seat assembly.

What is claimed is:

1. A valve comprising:
  a valve body having a valve chamber and fluid flow passages therethrough;
  a valve member mounted in the valve chamber for movement between an open position and a closed position relative to the fluid flow passages;
  an annular valve seat assembly mounted about at least one of the fluid flow passages adjacent the valve chamber for sealing against the valve member, the valve seat assembly having inner and outer seat rings relative to the flow passage, the seat rings being of generally cylindrical form and arranged in concentric juxtaposed relation to each other, and a sealing ring mounted therebetween, the outer seat ring having a concentric inner groove adjacent an end of the outer seat ring facing the valve member for mounting of the sealing ring therein, the inner seat ring having an outer peripheral frusto-conical portion adjacent the end facing the valve member such that when the two seat rings slidingly engage each other the frusto-conical portion of the inner seat ring engages and deforms the sealing ring mounted in the outer seat ring to provide a protruded annular sealing portion extending beyond the end of the seat rings which sealingly contacts the exterior surface of the valve member.

2. A valve as set forth in claim 1, including spring means positioned in the flow passage adjacent the end of the outer seat ring remote from the valve member to urge the valve seat assembly toward and into fluidtight sealing contact with the valve member.

3. A valve as set forth in claim 2, wherein:
  the outer seat ring has a peripheral seal groove around the exterior thereof between its ends with an O-ring mounted in the peripheral seal groove to provide a seal between the valve seat assembly and fluid flow passage; and
  the inner seat ring includes a conduit communicating between the inner and outer peripheral surfaces thereof such that fluid flow passage pressure is allowed to pressure energize the valve seat assembly in the direction towards the valve member once the spring means urges the protruded annular sealing of the sealing ring into sealing contact with the exterior surface of the valve member.

4. A valve as set forth in claim 1, wherein:
  the sealing ring is of generally triangular shaped radial cross-section and having an annular peripheral surface defining the inner circumference of the sealing ring, opposing annular planar surfaces defining the sides of the sealing ring, and a pair of coaxial frusto-conical surfaces extending outwardly at converging angles from the side surfaces to define the outer circumference of the sealing ring;

the inner groove of the outer seat ring having cooperating surfaces to receive the pair of frusto-conical surfaces and opposing annular planar surfaces of the sealing ring including a V-shaped outer circumferential groove, a radially extending planar side surface remote from the end of outer seat ring facing the valve member, and a radially extending lip portion adjacent the end of the outer seat ring facing the valve member so that when the two concentric seat rings slidingly engage each other the frusto-conical portion of the inner seat ring engages and deforms the inner annular peripheral surface of the sealing ring providing the protruded annular sealing portion extending beyond the confines of the inner seat ring frusto-conical portion and other seat ring lip portion to sealing engage the valve member.

5. A valve as set forth in claim 4, wherein the sealing ring is of a resilient rubber material.

6. A valve as set forth in claim 1, wherein:

the sealing ring is of generally rectangular shaped radial cross-section and having a pair of opposing annular peripheral surfaces defining the inner and outer circumference of the sealing ring, and a pair of opposing annular planar surfaces defining the sides of the sealing ring;

the inner groove of the outlet seat ring having cooperating surfaces to receive the sealing ring including an outer peripheral surface, a radially extending planar side surface remote from the end of the outer seat ring facing the valve member, and a radially extending lip portion adjacent the end of outer seat ring facing the valve member whereby upon sliding engagement of the concentric inner and outer seat rings the inner seat ring frusto-conical portion engages and deforms the inner annular peripheral surface of the sealing ring to provide a protruded annular sealing portion extending beyond the confines of the inner seat frusto-conical portion and outer seat ring lip portion to sealingly engage the valve member.

7. A valve as set forth in claim 6, wherein the sealing ring is of an elastomeric material.

8. A ball valve structure comprising:

a valve body having a valve chamber therein, fluid flow passages through the valve body in communication with the valve chamber, and an annular seat pocket formed at the juncture of at least one of the fluid flow passages and the valve chamber and having a valve seat supporting abutment therein;

a ball valve member positioned in the valve chamber movable between open and closed positions relative to the fluid flow passages;

an annular valve seat assembly positioned in the seat pocket and having inner and outer concentric seat rings of generally cylindrical form wherein the outer seat ring is arranged in juxtaposed relation to a portion of the inner seating with a sealing ring mounted therebetween, the outer seat ring having an inside peripheral surface facing the inner concentric seat ring, and a sealing ring mounting groove around the inside peripheral surface at one end portion thereof the receive and mount the sealing ring, the inner seat ring having a first outer peripheral surface adjacent the outer seat ring inside surface, and an outer peripheral frusto-conical portion adjacent the end facing the ball valve member whereby upon sliding engagement of the concentric inner and outer seat rings the frusto-conical portion of the inner seat ring engages and deforms the sealing ring positioned in the outer seat ring mounting groove to provide a protruded annular sealing portion extending beyond the ends of the inner and outer seat rings to sealingly contact the exterior surface of the ball valve member; and spring means positioned in the seat pocket, one end of which contacts the valve seat supporting abutment and the other end contacts the end of the outer seat ring remote from the ball valve member to urge the valve seat assembly and protruded annular sealing portion of the sealing ring toward and into fluid-tight sealing contact with the ball valve member.

9. A valve as set forth in claim 8, wherein:

the outer seat ring includes a peripheral seal groove around the exterior thereof with an O-ring mounted in the peripheral seal groove to provide a seal between the outer periphery of the valve seat assembly and the circumferential seat pocket wall, and the end of the outer seat ring remote from the ball valve member includes an inwardly extending radial abutment which contacts the first outer peripheral surface of the inner seat ring to prevent further sliding engagement of the inner and outer seat rings;

the inner seat ring includes an annular recess around the exterior thereof intermediate the first outer peripheral surface and a second outer peripheral surface of smaller diameter than the first outer peripheral surface to receive the outer seat ring abutment and allow sliding engagement of the outer seat ring, and a conduit communicating between the inner peripheral surface and the annular recess of the inner seat ring whereby fluid pressure existing in the fluid flow passage is communicated to the exterior of the inner seat ring and the seat pocket outwardly of the outer seat ring relative to the ball valve member so that the valve seat assembly is pressure energized in the direction toward the ball valve member once the spring means urges the protruded annular sealing portion of the sealing ring into sealing contact with the exterior surface of the ball valve member.

10. A valve as set forth in claim 8, wherein:

the sealing ring is of generally triangular shaped radial cross-section and having an annular peripheral surface defining the inner circumference of the sealing ring, opposing annular planar surfaces defining the sides of the sealing ring, and a pair of coaxial frusto-conical surfaces extending outwardly at converging angles from the side surfaces to define the outer circumference of the sealing ring;

the sealing ring mounting groove of the outer seat ring having cooperating surfaces to receive the pair of frusto-conical surfaces and opposing annular planar surfaces of the sealing ring including a V-shaped outer circumferential groove, a radially extending planar side surface remote from the end of outer seat ring facing the valve member, and a radially extending lip portion adjacent the end of the outer seat ring facing the valve member so that when the two concentric seat rings slidingly engage each other the frusto-conical portion of the inner seat ring engages and deforms the inner annular peripheral surface of the sealing ring providing the protruded annular sealing portion extending beyond the confines of the inner and outer seat rings to sealingly engage the ball valve member.

11. A valve as set forth in claim 10, wherein the sealing ring is of a resilient rubber material.

12. A valve as set forth in claim 8, wherein:

the sealing ring is of generally rectangular shaped radial cross-section and having a pair of opposing annular peripheral surfaces defining the inner and outer circumference of the sealing ring, and a pair of opposing annular planar surfaces defining the sides of the sealing ring;

the sealing ring mounting groove of the outer seat ring having cooperating surfaces to receive the sealing ring including an outer peripheral surface, a radially extending planar side surface remote from the end of the outer seat ring facing the valve member, and a radially extending lip portion adjacent the end of outer seat ring facing the valve member whereby upon sliding engagement of the concentric inner and outer seat rings the inner seat ring frusto-conical portion engages and deforms the inner annular peripheral surface of the sealing ring to provide the protruded annular sealing portion extending beyond the confines of the inner and outer seat rings to sealingly engage the ball valve member.

13. A valve as set forth in claim 6, wherein the sealing ring is of an elastomeric material.

14. A valve seat assembly for a valve having a movable valve member, the valve seat assembly having inner and outer concentric seat rings of generally cylindrical form wherein the outer seat ring is arranged in juxtaposed relation to a portion of the inner seat ring with a sealing ring mounted therebetween, the outer seat ring having an inside peripheral surface facing the inner concentric seat ring, and a sealing ring mounting groove around the inside peripheral surface at one end portion thereof adjacent the valve member to receive and mount the sealing ring, the inner seat ring having an outer peripheral surface adjacent the outer seat ring inside surface and an outer peripheral frusto-conical portion adjacent the end facing the valve member whereby upon sliding engagement of the concentric inner and outer seat rings the frusto-conical portion of the inner seat ring engages and deforms the sealing ring positioned in the outer seat ring mounting groove to provide a protruded annular sealing portion extending beyond the ends of inner and outer seat rings to sealingly contact the exterior surface of the valve member.

* * * * *

UNITED STATES PATENT AND TRADEMARK OFFICE
CERTIFICATE OF CORRECTION

PATENT NO. : 4,477,055
DATED : October 16, 1984
INVENTOR(S) : Charles C. Partridge It is certified that error appears in the above-identified patent and that said Letters Patent is hereby corrected as shown below:

Column 6, line 59, after "sealing" (first occurrence) and before "of", insert -- portion --.

Column 7, line 65, change "the" (first occurrence) to -- to --.

Signed and Sealed this

Twenty-ninth Day of October 1985

[SEAL]

Attest:

DONALD J. QUIGG

Attesting Officer

Commissioner of Patents and
Trademarks—Designate